United States Patent
Rasmussen

(10) Patent No.: US 6,575,117 B1
(45) Date of Patent: Jun. 10, 2003

(54) RAIN RESPONSIVE ANIMAL FEEDER

(76) Inventor: Melvin A. Rasmussen, 801 W. Norris, El Campo, TX (US) 77437

( * ) Notice: Subject to any disclaimer, the term of this patent is extended or adjusted under 35 U.S.C. 154(b) by 0 days.

(21) Appl. No.: 09/876,718

(22) Filed: Jun. 7, 2001

(51) Int. Cl.[7] .................... A01K 5/00; A01K 39/00
(52) U.S. Cl. .................................................. 119/57.1
(58) Field of Search ........................ 119/57.1, 57.92, 119/51.02, 57.91; A10K 5/02, 39/012

(56) References Cited

U.S. PATENT DOCUMENTS

| | | | | |
|---|---|---|---|---|
| 3,547,081 A | * | 12/1970 | Geerlings | 119/51.11 |
| 4,182,273 A | * | 1/1980 | Peterson | 119/51.5 |
| 4,660,508 A | * | 4/1987 | Kleinsasser et al. | 119/51.5 |
| 4,743,717 A | * | 5/1988 | Peterson | 200/84 C |
| 4,945,859 A | * | 8/1990 | Churchwell | 119/57.91 |
| 5,010,849 A | * | 4/1991 | Kleinsasser | 119/53 |
| 5,259,337 A | | 11/1993 | Rasmussen | 119/57.1 |
| 5,311,838 A | * | 5/1994 | Thomas et al. | 119/51.5 |
| 5,333,572 A | * | 8/1994 | Nutt | 119/57.91 |
| 5,463,980 A | | 11/1995 | Rasmussen | 119/57.1 |

* cited by examiner

Primary Examiner—Charles T. Jordan
Assistant Examiner—Susan C. Alimenti
(74) Attorney, Agent, or Firm—Kenneth H. Johnson

(57) ABSTRACT

An animal feeder having a hopper from which an electrically powered motor dispenser discharges feed to inclined surfaces into a feeding trough, has a rain sensing device attached to it and exposed to receive rain. The rain sensing device is installed in the electrical circuit of the motor. Rain causes the sensing device to break the circuit thereby disengaging the motor from its power source until the sensing device no longer is affected by the rain and the circuit is restored and the motor returned to operability.

2 Claims, 2 Drawing Sheets

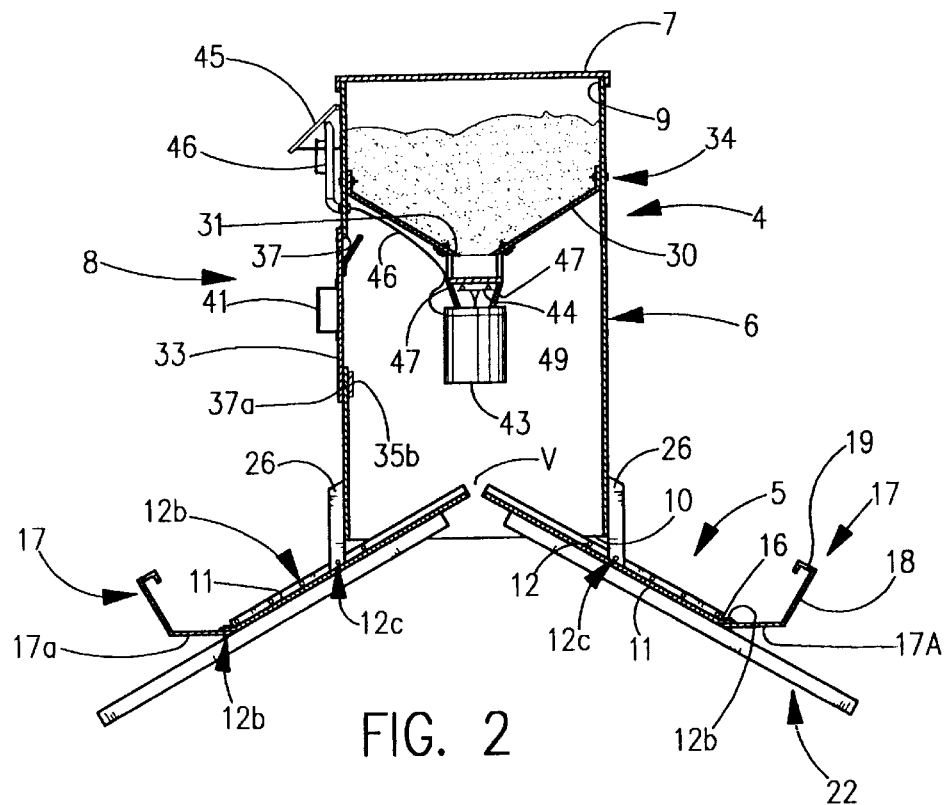
FIG. 2
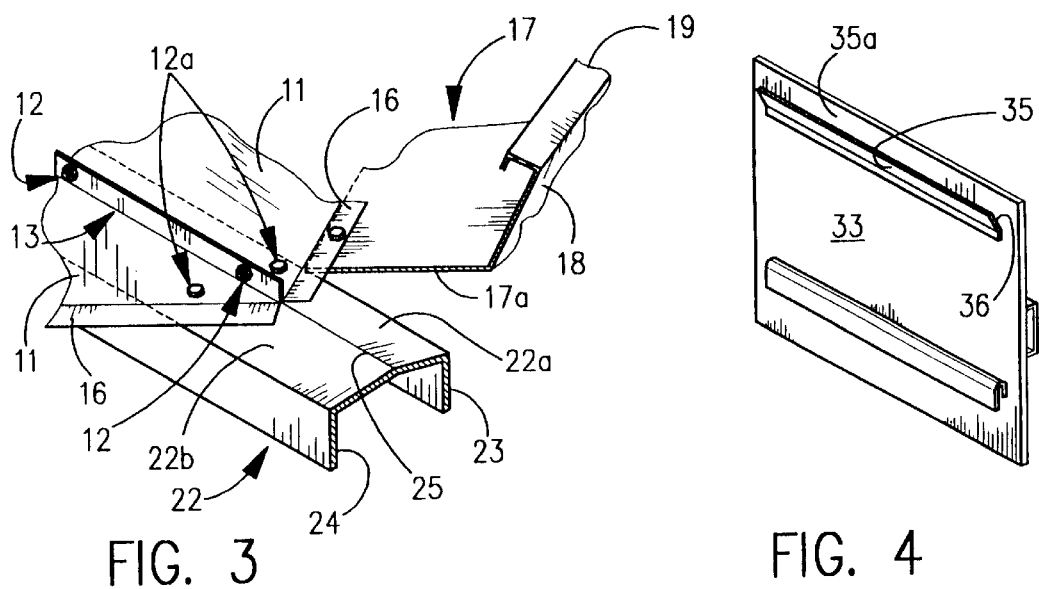
FIG. 3
FIG. 4

RAIN RESPONSIVE ANIMAL FEEDER

BACKGROUND OF THE INVENTION

Field of the Invention

Various types of animal feeders are available and in use for storing and providing feed for animals in a feeding trough. The present invention provides a relatively simple construction which is sturdy and readily accessible for resupplying with feed as may be required and provides a shut off to prevent dispensing feed during periods of rain.

SUMMARY OF THE INVENTION

Briefly the present invention is in the combination of an electrically operated animal feeder and a rain detection device operably installed into an electrical circuit that powers the feeder, said rain detection device being actuated by rain to break said circuit and temporarily deactivate the feeder.

The present invention provides an animal feeder which can be readily assembled on location. It may be constructed in various sizes depending upon the use to which it is to be put and is constructed so that it withstands contact and being turned over, or bumping, by large animals during feeding from a trough forming part thereof. It includes a solar actuated power supply for assisting in discharging food from a food supply container to the feed trough as necessary or desirable. It also includes a rain sensor that shuts off the feeder during periods of rain to prevent the feed from becoming soaked and ruined.

BRIEF DESCRIPTION OF THE DRAWINGS

FIG. 2 is a vertical sectional view of FIG. 1 showing the preferred form of the animal feeder.

FIG. 3 is an enlarged partial perspective view illustrating in detail a preferred arrangement and relationship of the lower edge of the inclined surfaces, the support legs and bottom surface of the feeding trough.

FIG. 4 is a perspective view of the inner surface of the closure for the side entry.

DESCRIPTION OF THE PREFERRED EMBODIMENT

Figure 1:
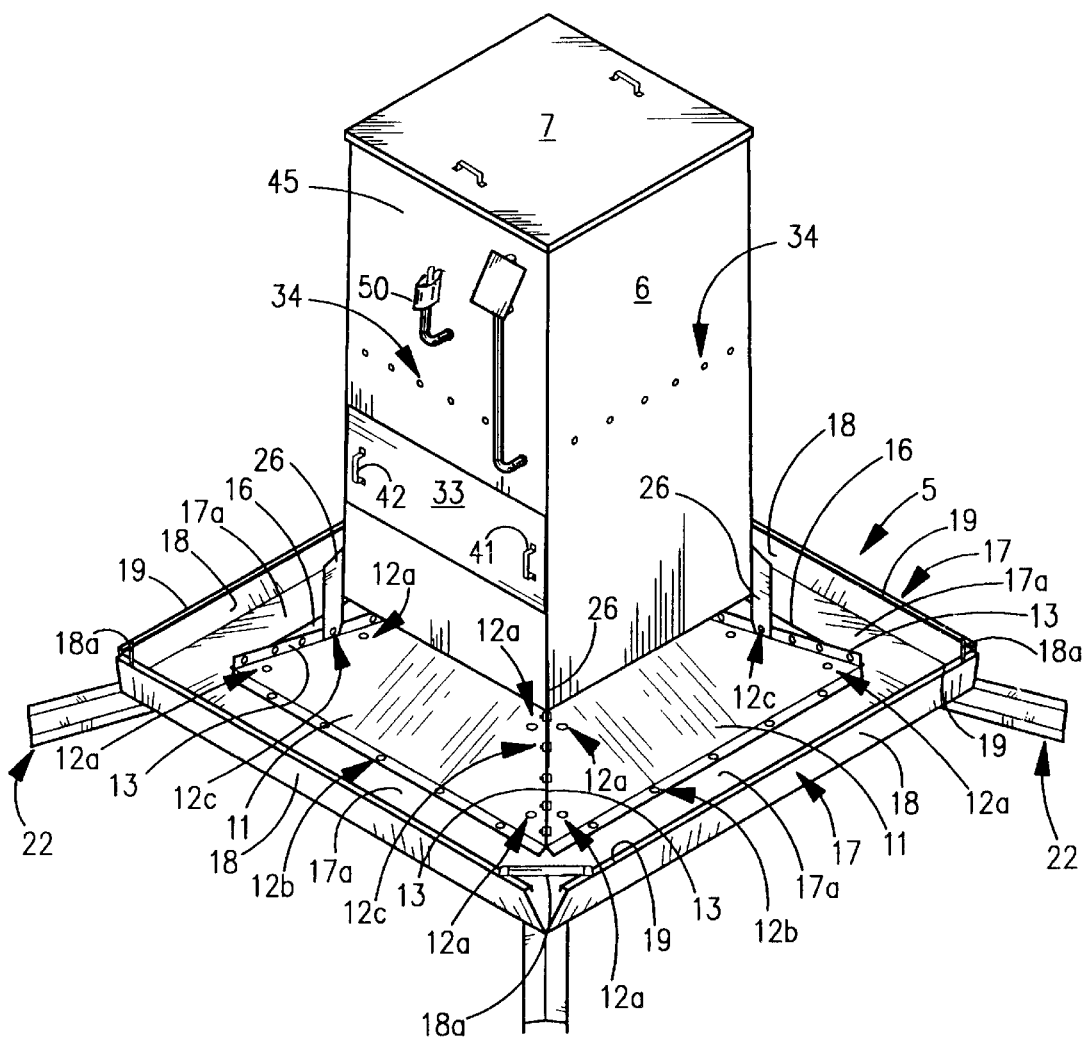
FIG. 1 is a perspective view showing the animal feeder of the present invention assembled for use.

Attention is first directed to FIG. 1 of the drawings wherein the preferred form is represented generally by the numeral 4. It includes a feeding trough, represented generally at 5, a feed supply, or storage container, or bin 6 with a cover 7 thereon and a side entry with closure 33. The cover 7 is provided with handles 8 as shown to assist in removal and positioning of the cover. The upper end 9 and lower end 10 of the container 6 are open or may be opened, as better seen in FIG. 2, for receiving animal feed therein and discharging the animal feed from the container to the feeding trough, respectively, as will be described in greater detail hereinafter.

The feeding trough 5 includes a plurality of downwardly inclined surfaces 11 which are joined together in any suitable manner, such as by nuts and bolts represented generally at 12 which extend through adjacent upstanding shoulders, or ribs, referred to generally at 13, formed on the adjacent edges of the surfaces 11 as shown in FIG. 1.

The surfaces 11 are connected to form an open apex or open vertex V at their upper ends as shown in FIGS. 2 and 3. Four inclined surfaces 11 each of triangular form are shown in FIG. 1 as forming the downwardly inclined surface portion of the trough 5, but it can be appreciated that any suitable number of surfaces may be employed as desired to form the downwardly inclined surface portion of the trough including a single conical surface.

The downwardly inclined surface portion formed by inclined surfaces 11 of the feeding trough terminates in lower bent edge surface 16 on each of the inclined surfaces 11 which lower edge surfaces are bent out of the inclined plane of the inclined surfaces 11 as seen in FIGS. 1–3.

A bottom surface referred to generally at 17 extends or projects from the lower bent edges 16 of the inclined surfaces 11 of the feeding trough and includes a surface portion 17a which is preferably in a generally horizontal or parallel relation relative to the lower open end 10 of the bin 6 as shown in the drawings. The bottom surface 17 also includes an upwardly extending surface portion 18 which terminates in the inverted J shaped top edge 19 as shown which is above, or higher than the lower bent edge 16 of the inclined feeding trough surface as shown.

The bottom surface 17 may be formed integrally with the inclined surfaces 11 in any suitable manner such as stamping sheet metal, but preferably the bottom surface 17 is formed from a separate piece of metal that includes the portion 17a that is generally parallel to the plane of the lower open end of the bin 6, as well as the upwardly extending portions 18 and the inverted J shaped top edges 19.

The generally parallel surface portion 17a of the separate bottom surface 17 is secured in position underneath the lower bent edges 16 of the inclined surfaces 11 of the feeding trough by suitable means such as by nuts and bolts as represented at 12b so, as previously stated, that the structure can be readily assembled on location.

The ends of upwardly extending surfaces 18 are spaced at the corners of the feeding trough 5 and are secured together by a brace 18a as shown to form an opening the bottom surface 17 of the feeding trough for discharge of water from the feeding trough.

Support legs, referred to generally at 22, extend along and underneath the inclined surfaces 11 of the feeding trough a suitable distance, such as by way of example only, as illustrated in FIG. 2 they extend from adjacent the open vertex V downwardly and outwardly beyond the upwardly extending portion 18 of the bottom surface 17.

The extension of the legs beyond the outer or lower edges of the feeding trough provides stability to the structure and resists turning over when bumped or moved by contact with animals. Also, the legs are formed in a general U configuration, with the base of the U formed by two inclined portions 22a and 22b with the legs of the U being vertical portions 23 and 24 depending from the inclined portions 22a, 22b, respectively, as shown in the drawings. This configuration provides strength to the legs and also forms them so the surfaces 22a and 22b and their longitudinal juncture 25 generally conform to the juncture of the four inclined surfaces 11 at their adjacent, secured edges. The legs 22 are preferably secured in position on the feeding trough at the junctures of the four surfaces by nuts and bolts as shown in the drawings.

The container, or bin 6 may be of any suitable configuration, and as shown it is a quadrilateral. The four walls forming the container 6 extend upwardly from the lower open end 10 of the container and terminate at the upper open end 9 as shown. Bin supports 26 are secured to the container adjacent its lower open end 9 and to the ribs, or shoulders 13 of the inclined surfaces 11 of the feeding trough by nuts and bolts represented generally at 12c as shown in the drawings.

The supports 26 for bin 6 may be of any suitable form such as plates welded to the lower part, or adjacent the lower end of the container 6 and depending therefrom as shown so that when the container is secured to the feeding trough, the open lower end of the container will be spaced above, but adjacent the inclined surfaces 11, the plates may be secured to the upstanding shoulders 13 of the inclined surfaces 11 by suitable means such as nuts and bolts 12c.

A funnel shaped hopper 30 is secured in the bin 6, and preferably engaged with the walls of the bin by any suitable means such as nuts and bolts, represented generally at 34. The hopper is of standard configuration, and is provided with an opening 31 for discharge of the animal feed from the hopper to the feeding trough as will be described. The hopper is secured intermediate the upper and lower ends of the bin 6 and above the inclined surfaces 11 of the feeding trough as shown. The central axis of the opening 31 is preferably aligned with the open vertex V as shown.

The container includes a side entry or opening of any suitable configuration, and is shown as rectangular with a top edge 37 and a lower edge 37a. A closure 33 of suitable configuration is provided for the opening. This provides access to the interior of the container 6 for access to the interior of the bin 6 as may be necessary. For example, replacement of the battery (not shown) or motor (not shown), as may be necessary, both of which are supported in the support 43 below and adjacent the hopper opening 31. Preferably the support 43 is aligned with the hopper opening 31.

One form of the closure 33 is shown as rectangular and is also illustrated as being removable from the container. It includes handles 41, 42 for assisting in positioning and removal on the bin 6.

The closure 33 is provided with an upper projection 35 formed, or secured on its inner surface 35a which projection extends outwardly from the inner surface 35a to form a space 36 between it and the inner surface 35a of the closure on which it is mounted, as better seen in FIG. 4. To position the closure in place to close off the opening, the closure 33 is manipulated so that the upper edge 37 of the side entry opening is engaged between the upper projection 35 and the inner surface 35a of the closure as shown in FIG. 2 of the drawings.

The closure 33 is then lifted until the lower edge 37a of the opening is aligned with the space between the lower projection 35b and the inner surface 35a. The closure is then lowered, or it falls by its own weight to engage the lower edge 37a in the space between the projection 35b and the inner surface 35a. The length and configuration of projection 35 which defines the length of upper space 36 is such that when the closure 33 moves down, the upper edge 37 of the opening remains engaged in space 36 between projection 35 and the surface on which it is secured.

Removal of the closure 33 is accomplished by lifting it to elevate the lower projection 35b above the lower edge 37a and tilting the lower end of the closure outwardly to remove the lower closure out of the opening. This enables the closure to be lowered to be disengaged from the top edge 37 of the opening.

If desired, the projections may be formed on members pivotally mounted on the closure which projections are adjacent, but spaced from the inner surface of the closure to provide spaces to engage the inner surfaces on the side entry. These projections would extend through the closure with handles on the outer ends thereof so that the projections could be manually moved to engage them with adjacent inner surfaces on the opening in the container to hold the closure in place on the container.

Also, the closure may be pivotally mounted on the container adjacent the side entry therein so that it can be moved to close or open the side entry as desired.

As previously noted, the support 43 supports a battery and motor therein and the motor rotatable shaft is represented at 49 extending upwardly from the motor.

The battery is of any type well known to those skilled in the art which may be charged by a solar panel, of any suitable known type, mounted on the container and represented by the numeral 45. Solar panel model 682 sold by Spincaster, 5674 Randolph Blvd., San Antonio, Tex. 78233, is one type of solar panel that functions quite well. It includes an on/off switch, flow rate adjustment with one to six time intervals available during any 24-hour period. Pipe 46 receives electrical conduit 46 that connects the battery with the solar panel as shown to convey power to maintain the battery charged for operating the motor.

The motor shaft has secured adjacent, or on the upper end thereof a plate 44 which rotates with the motor shaft when it is turned on. When the motor turns off, animal feed such as pellets of any wall known type such as deer pellets, cow pellets and the like, or grains, by way of example only, corn or rice stack up on the plate when it stops and blocks the flow from the hopper opening 31.

When the motor rotates, the plate rotates and throws the grain outwardly which disperses it in the container so that the animal feed is discharged through the container open lower end onto the inclined trough surfaces 13, and it then flows onto the bottom surface. If desired, upstanding members 47 may be secured on the plate 44 in opposed relationship as shown which further assists in stacking the feed on the plate when the motor is shut off, and also assists in dispersing the feed as the plate rotates.

A rain sensor 50 which is attached on a bracket 51 next to the solar panel 45 and electrical wires (not shown) enter through conduit 46 into the circuit between the battery and the motor. A suitable rain sensor is a MINI-CLIK model 502. When the rain sensor senses rain it opens the circuit from the battery to the motor and prevents the feeder from operating. The electrical connection of the rain sensor/switch is conventional and is well known in the art. The MINI-CLIK model 502 operates by having a component which swells when moistened by water forcing the circuit to open thereby deactivating the feeder and which returns to its original size when dry allowing the circuit to close thereby reactivating the feeder.

The foregoing disclosure and description are illustrative and explanatory thereof, and various changes in size, shape and material as well as in the details of the illustrated construction may be made without departing from the spirit of the invention.

The invention claimed is:

1. An animal feeder comprising;

a feeding trough;

a hopper connected to said feeding trough;

an electrically powered dispersing means for dispersing animal feed discharged from said hopper into said feeding trough; and a rain sensor supported on said hopper which senses rain and prevents said dispersing means from operating during periods of rainfall.

2. An animal feeder comprising;

a feeding trough;

said feeding trough comprising: downwardly inclined surfaces terminating in lower edges and a bottom surface secured to and projecting outwardly beyond said lower edges of said downwardly inclined surfaces forming an open vertex, said bottom surface including an upwardly extending surface portion which portion terminates adjacent and above said lower edges of said downwardly inclined surfaces;

a container, said container having an open lower end and a wall surface extending upwardly from said open lower end to form a receptacle for animal feed, said open lower end spaced upwardly from said inclined surfaces and receiving said open vertex therein;

legs secured to and extending upwardly from said inclined surfaces and engaged with said container to secure said container in position on said inclined surfaces of said trough;

a hopper secured in said container in spaced relation above said open lower container end, said hopper having an open lower end for discharging animal feed from said hopper and said open lower end of said hopper spaced above said open vertex of said inclined surfaces;

a disperser for dispersing the animal feed discharged from said hopper onto the inclined surfaces of said feeding trough comprising: a motor positioned beneath said hopper open lower end and aligned therewith, said motor having an upwardly extending rotatable shaft aligned with the open lower end of said hopper and a plate on said shaft aligned with said hopper open lower end;

a battery for supplying power to said motor;

a support secured to said hopper for supporting said motor and said battery in said container;

a solar actuated source for charging said battery;

conductor means for transmitting power from said solar actuated source to said battery for supplying power to said motor to rotate said shaft and plate whereby animal feed discharged through said hopper open lower end onto said plate is dispersed within said container to fall on said inclined surfaces of said trough; and a rain sensor mounted on said hopper which opens the circuit between said battery and said motor during periods of rainfall.

* * * * *